May 19, 1931.  J. R. KELLER  1,805,987

METHOD AND APPARATUS FOR FEEDING MOLTEN GLASS

Filed March 7, 1922   3 Sheets-Sheet 1

INVENTOR
John R. Keller
By Kay, Totten & Brown
Attorneys

May 19, 1931.    J. R. KELLER    1,805,987
METHOD AND APPARATUS FOR FEEDING MOLTEN GLASS
Filed March 7, 1922    3 Sheets-Sheet 2

May 19, 1931. J. R. KELLER 1,805,987
METHOD AND APPARATUS FOR FEEDING MOLTEN GLASS
Filed March 7, 1922 3 Sheets-Sheet 3

INVENTOR
John R. Keller,
By Kay, Totten & Brown
Attorneys

Patented May 19, 1931

1,805,987

UNITED STATES PATENT OFFICE

JOHN R. KELLER, OF CARNEGIE, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE

METHOD AND APPARATUS FOR FEEDING MOLTEN GLASS

Application filed March 7, 1922. Serial No. 541,775.

My invention relates to the separation of molten glass into mold charges for the fabrication of glassware by pressing or blowing.

The object of my invention is to provide an improved method and apparatus for feeding molten glass in which a continuous stream of glass is delivered from a receptacle and is acted upon by means wholly outside of the receptacle to accumulate successive mold charges of uniform weight and temperature, and to deliver the accumulated mold charges in proper condition for molding.

The main characteristic of my invention consists in the use of centrifugal force as an agent for separating a flowing stream of glass into successive masses of the proper size, shape and fluidity for molding, the centrifugal force being specifically applied by means of a rotary cup having a discharge opening in its bottom and adapted to receive a descending stream of glass and to set up centrifugal force which expands the stream and allows it to accumulate in the cup, after which the speed of rotation of the cup is reduced or stopped and the accumulated gather of glass is allowed to flow through the discharge opening into a mold or other receptacle, or upon a chute which conveys the gather to the mold.

One of the early methods of gathering mold-charges of glass from a tank or pot consisted in thrusting the end of a punty into the glass, turning the punty to wind up a ball of glass on the punty, then transferring the punty with the glass to a position above the mold, allowing the glass to drain from the punty into the mold, and then cutting off the connecting thread of glass by means of shears. When the problem of carrying out this hand operation by mechanical means was first attacked, efforts were made to mechanically reproduce the hand punty operation, the punty rod being rotated mechanically and being either thrust into a mass of glass or placed beneath a descending stream of glass, and the rotation of the punty being sufficiently slow to permit the winding up of a strand of the viscous glass upon the punty, without setting up centrifugal force which would have thrown the glass away from the punty.

Another method of glass feeding was proposed, and was brought into commercial use, consisting in causing the glass to flow in a continuous stream through a discharge outlet and receiving the stream in a cup where the stream was allowed to accumulate. When a sufficient quantity had been obtained the glass was cut off and the charge transferred from the cup to the mold. This is known as the stream-feeding method of charge formation, and it is to the stream-feeding method that my present invention broadly relates.

As in the prior stream-feeding methods, I proceed by causing the glass to flow from a receptacle through an outlet, which outlet may be an opening in the bottom of the receptacle or a lip or dam over which the glass flows. The descending stream is caught in a cup which rotates on a vertical axis at a rate sufficient to expand the descending stream by centrifugal force, thereby checking the descent of the glass either partially or wholly, and permitting the glass to accumulate in the rotating cup without, however, coiling and lapping in such a way as to make the mold charge irregular in temperature, as is the case in prior stream-feeding methods. When a sufficient quantity of glass has been accumulated in the rotating cup, the speed of rotation is reduced, which permits the glass to issue through an opening which is provided in the bottom of the cup in line with its axis of rotation. The speed of rotation of the cup may be reduced gradually or quickly, or part gradually and part quickly, and by this means considerable variation in the shape and weight of the glass delivered can be secured. The glass delivered from the cup is preferably caused to hang freely below the cup and is severed either by starting up the rotation of the cup quickly, in order to twist off the glass just below the cup or, preferably, the hanging gather of glass is cut off by means of mechanical shears.

Subsidiary features of my invention include the cooling of the rotary cup in order to reduce the adherence of the glass to the walls of the cup, the provision of flutes on the inner surface of the cup to aid the cup in taking hold of the glass, the provision of a guard below the cup for correcting any tendency of the hanging glass to swing bodily around the axis of rotation, and the provision of a starting member for interrupting the flow of glass at the beginning of the feeding operation. These subsidiary features need not be employed, however, and may be varied in many ways.

As a modification of my invention, the rotary cup may be given a horizontal reciprocating movement in addition to its rotation, for the purpose of causing the stream of glass to fall into the cup at one side of its axis of rotation, so that the glass is laid around the bottom opening of the cup during the accumulation of the glass, after which the cup is moved to bring its bottom opening in line with its axis of rotation, and the rotation is reduced or stopped, whereupon the stream of glass which descends into the cup adds its impulse to the glass in the cup and assists in forcing the glass through the cup opening.

In the accompanying drawings.

Figure 1:
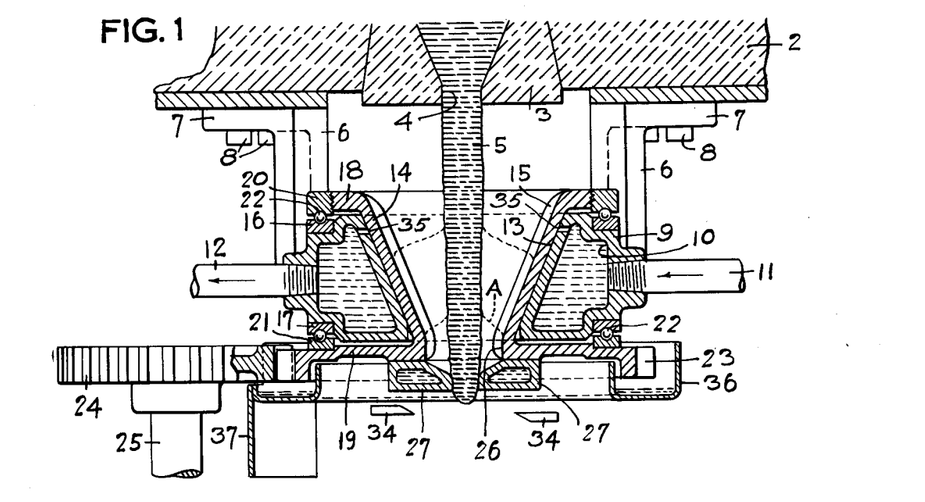
Fig. 1 is a vertical sectional view taken centrally through a centrifugal gathering cup constructed and operated in accordance with my invention.
Figure 2:
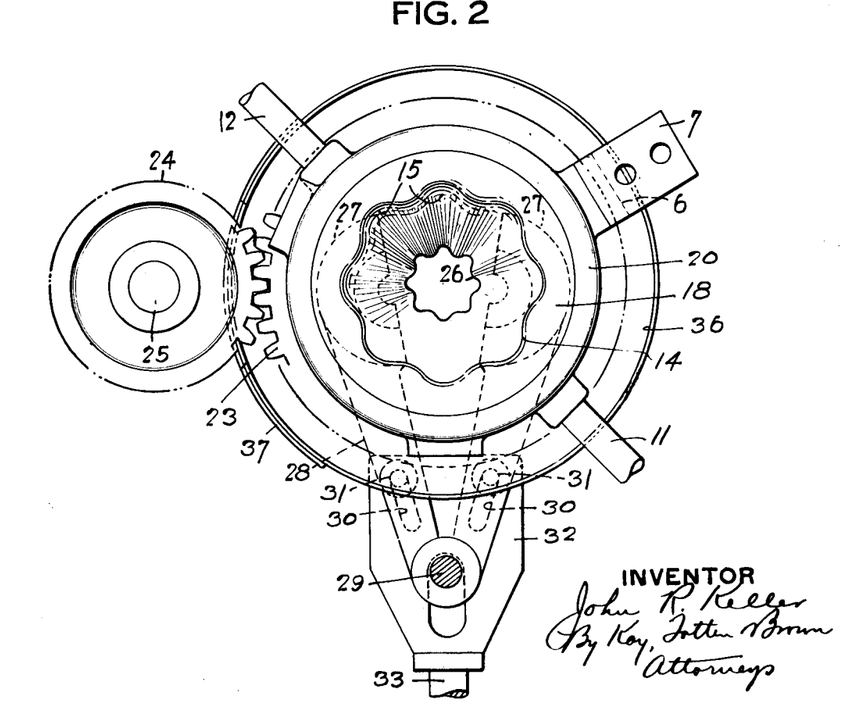
Fig. 2 is a plan view of the cup shown in Fig. 1.

In Fig. 1 the numeral 2 indicates a portion of the bottom of a receptacle for molten glass, which may be the forehearth of a tank, but may also be any other suitable receptacle. A bushing 3, having an outlet opening 4 is inserted in the bottom 2 of the receptacle, and a stream of glass 5 flows continuously through the opening 4. Hangers 6, having flanges 7, are secured beneath the receptacle bottom by means of bolts 8 and serve to suspend a hollow circular box 9 having a chamber 10 through which cooling water may be circulated by means of inlet and outlet pipes 11 and 12. The box 9 may be made in two or more sections if desired and is provided with a downwardly converging conical bore 13 adapted to receive a correspondingly tapered rotary cup 14 which may be provided on its inner surface with flutes 15, as best shown on Fig. 2. These flutes may be straight from top to bottom of the cup, as shown, or may be slightly twisted or spiral, in order to assist the cup to engage and rotate the glass.

Upper and lower ball races 16 and 17 are carried by the box 9 at its upper and lower edges, and support the rotary cup 14 which is provided with upper and lower flanges 18 and 19 having ball races 20 and 21 which cooperate with the ball races 16 to 17 to receive bearing balls 22. As shown, the upper ball race 20 is formed in a ring which is screw-threaded upon the upper flange 18 of the cup 14.

The lower flange 19 of the cup 14 carries a spur gear ring 23 which may be formed integral with, or attached to, the flange 19, and which meshes with a driving gear 24 secured to the upper end of a shaft 25 which is driven from any suitable source of power, not shown.

Beneath the discharge opening 26 of the cup 14 is a divided supporting ring consisting of two sections 27 which are made hollow for the circulation of water or other cooling fluid, and which are carried at the ends of two arms 28 which are loosely mounted upon a common pivot 29 and are provided with slots 30 in which are received pins 31 carried by a slide plate 32 to which is attached a rod 33 which is reciprocated by any suitable connections, not shown.

Below the supporting ring is a pair of shears indicated diagrammatically at 34.

Ports 35 are formed in the sloping walls of the box 9 to admit water from the interior of the box to the exterior surface 13 of the cup 14. The water thus admitted forms a film between the box 9 and the cup 14 which lubricates the surface 13, and passes down along this bearing surface and out through the space between the lower surface of the box and the lower surface 19 of the cup, and is received in a circular trough 36 having suitable drainage connections for removing waste water. A guard plate 37 may be arranged below the trough 36 on the side of the gear 24 in order to prevent the meshing gears from splashing water into the space below the gathering cup.

Figures 3, 4, 5, 6, 7, 8:
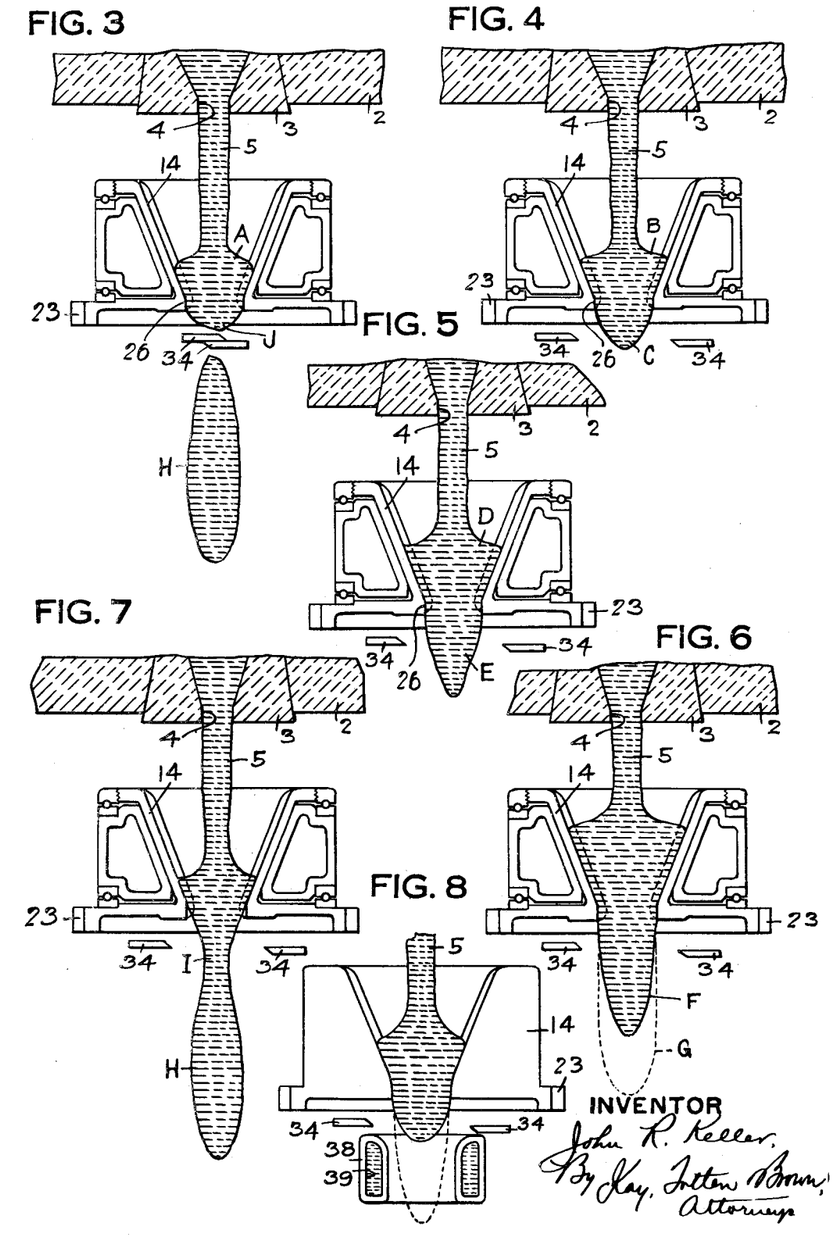
Figs. 3 to 7, inclusive, are diagrammatic vertical sectional views showing the successive stages in which the glass is handled.
Fig. 8 is a diagrammatic vertical sectional view of a portion of the gathering cup, showing a guard beneath the cup outlet.

If the glass below the cup should happen to be somewhat off-center with respect to the axis of rotation, the entire mass of glass may be given a bodily swinging movement, and in order to prevent this swinging movement I may provide a guard 38 as shown in Fig. 8. This guard may be provided with water cooling chambers 39 and may be secured in any suitable way beneath the rotary cup, suitable space being left for the admission of the shears 34.

The details of construction just described, while suitable for carrying out my invention, are by no means necessary, the only requirement being that the glass shall be allowed to flow in a descending stream and shall be intercepted in a rotary cup having a discharge opening in its bottom.

The several stages in which the glass is handled in the operation of the above described apparatus may be best understood by referring in turn to Figures 1 and 3 to 7. Fig. 1 shows the condition when the machine is started. The glass 5 flows down through the opening 4 and contracts somewhat as it descends, the diameter of the stream being less than the smallest diameter of the cup 14. Therefore, it is necessary to intercept the stream momentarily until a sufficient body of glass is accumulated to be set in motion by the cup 14. For this purpose the sections 27 of the supporting ring are closed and engage the stream near its lower end. The supporting member, instead of being a ring, may be a solid plate or other member applied either mechanically or by hand, but in order to reduce the chilling of the lower end of the stream I prefer to intercept the stream by means of a ring-shaped member, as shown. This ring or other supporting member will be used only when the machine is started, except when gathers of very large size are being made and a cup having a large bottom opening is used, in which case it may be desirable to employ the supporting member at the beginning of each charge-forming operation.

As soon as a sufficient accumulation of glass takes place to enable the cup 14 to take hold of the glass, which amount is approximately indicated in dotted lines at A, Fig. 1, the cup takes hold of the glass and sets up centrifugal force which spreads the glass laterally and checks its downward movement so that the supporting ring may be removed and the glass remains in the position shown in Fig. 3. When a cold cup is employed, the glass adheres but slightly, or not at all, to the surface of the cup 14 since this surface is cooled by the water, which circulates between the cup and the box 9. For this reason the flutes 15 may be used to advantage, as they enable the cup to take better hold of the glass.

As the cup 14 continues to rotate the glass builds up, as shown at B, Fig. 4, and at the same time may draw down slightly through the cup opening 26, as shown at C. The glass is thoroughly mixed with the fresh descending glass 5 by the rotary movement set up in the glass by the cup 14, and therefore remains in a condition of uniform temperature. The slight cooling of the glass, while being accumulated in the rotary cup, may be compensated for by slightly increasing the temperature of the glass in the tank or other receptacle to a point somewhat above the proper working temperature, so that after the glass is gathered in the cup it is brought to the proper temperature for working.

When a sufficient quantity of glass has been accumulated in the cup to form a mold charge, which may be an amount indicated at D, Fig. 5, the rotation of the cup 14 is reduced, thus permitting the glass to flow down through the cup outlet 26, as shown at E, Fig. 5. The speed of rotation of the cup may be reduced partially, or the cup may be entirely stopped, according to the shape and weight of the gather to be delivered. The descending stream of glass 5 adds its impulse to the descent of the glass which has accumulated in the cup, and the result is that a pendant drop of glass forms beneath the cup outlet 26 having uniform shape which is always circular, and may be approximately cylindrical for the greater part of its length, or may be otherwise shaped according to the manner in which the rotation of the cup is checked, and according to the time during which the glass has accumulated in the cup. Fig. 6 shows in full lines at F the approximate appearance of the glass when it has partly descended, and in dotted lines at G the approximate outline of the glass when it has descended still further. Fig. 7 shows at H a typical drop form which is beginning to pull away from the glass which remains in the cup 14, thereby forming an attenuation or neck at I, which is then cut off by means of the shears 34, whereupon the gather H drops into the mold, or upon a conveying chute, in the form shown in Fig. 3.

At about the time when the shears 34 sever the glass the cup 14 is again started to rotate or, if the cup has not been entirely stopped, its speed of rotation is increased. This rotation may be begun an instant before the shears cut the glass. In order to increase the attenuating effect at the point of severance, or it may be preferable not to start the rotation of the cup until the shears have severed the glass. In either case the protruding stub of glass J, Fig. 3, is lifted from the shears and the remnant of glass A remaining in the cup 14, as shown in Fig. 3, is again set in motion by the rotation of the cup and forms a nucleus for the next gather which is formed in the manner described above.

Figure 9:
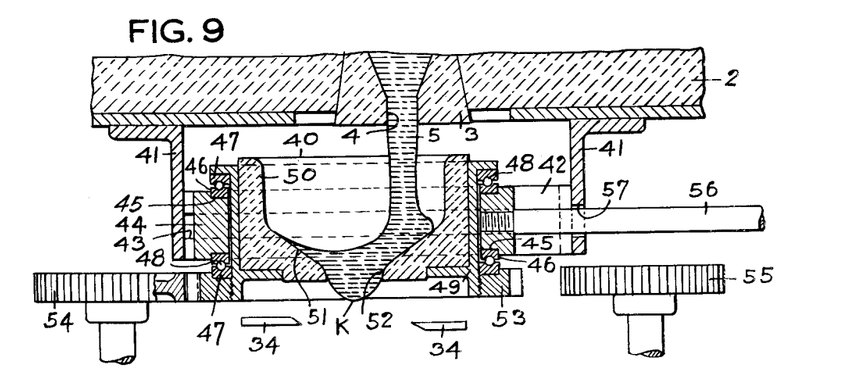
Fig. 9 is a vertical sectional view of a modified form of cup having horizontal movement as well as rotary movement, the cup being shown in the position in which the glass is first received in the cup.
Figure 10:
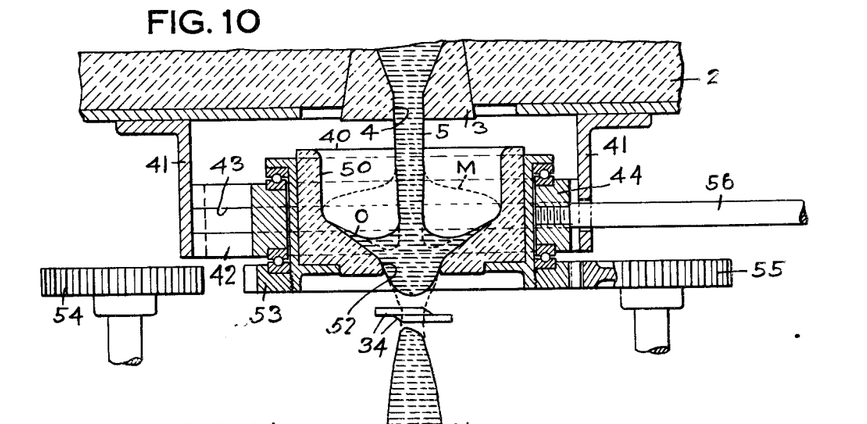
Fig. 10 is another vertical sectional view similar to Fig. 9, showing the cup in its glass-discharging position with its bottom opening in line with the descending stream of glass.
Figure 11:
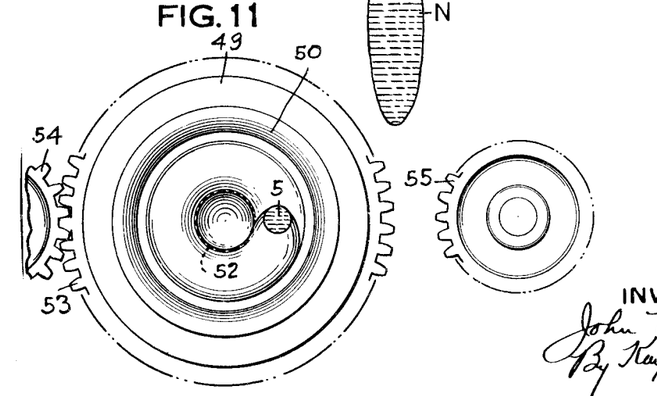
Fig. 11 is a plan view of a portion of the mechanism of Figs. 9 and 10.

Figs. 9 to 11 show a modified device in which the stream 5 issuing through the outlet 4 in the receptacle 2 is received in a centrifugal cup 40 which has not only a rotary movement on a vertical axis, but also a horizontal reciprocating movement between the positions shown in Figs. 9 and 10. This combined movement may be produced in various ways. One simple arrangement is shown in the drawing, consisting of two hangers 41 which are secured to the under side of the receptacle 2 and support two parallel horizontal guide members 42, only one of which is shown in the drawings. Guide grooves 43 are formed in the members 42 and receive suitable guide lugs in a box 44 which has upper and lower circular seats 45 in which are ball races 46, which cooperate with circular ball races 47 to hold bearing balls 48. The ball races 47 are carried by a circular rotary cup frame 49 in which rests a cup 50 suitably composed of fire clay or other refractory material, having an inclined conical bottom 51 which terminates in a circular outlet opening 52.

Around the bottom of the cup frame 49 is secured a gear ring 53 adapted to mesh with either one of two spur gear wheels 54 and 55. A rod 56 extends through an opening 57 in one of the hangers 41 and is secured to the sliding box frame 44. The rod 56 may be reciprocated by any suitable means, not shown, to bring the centrifugal cup alternately to the position shown in Fig. 9 and to the position shown in Fig. 10.

Fig. 9 shows the position of the parts at the beginning of a charge-forming operation. The stub of glass K remaining after the preceding gob has been severed by means of the shears 34 remains protruding somewhat from the cup opening 52, and is lifted by the remnant of glass L remaining in the cup 50, this remnant being expanded by the rotation of the cup produced by the gear 54. The stream 5 of glass descends from the receptacle opening 4 eccentrically with respect to the axis of rotation of the rotary cup. This results in depositing the glass in the cup in the form of a ring lying around the cup opening 52, as best shown in Fig. 11. When a sufficient quantity of glass has accumulated in the cup, which may be, for example, an amount indicated in dotted lines at M, Fig. 10, the rod 56 is operated to move the cup from the displaced position in Fig. 9 to the position of Fig. 10, where the axis of rotation of the cup is directly beneath the outlet opening 4 from the receptacle 2. The gear wheel 5 is kept stationary for a time, and the glass therefore flows out through the cup opening 52 by its own weight, assisted by the impulse of the descending stream 5. If desired, the gear wheel 55 may at this time be rotated to turn the centrifugal cup at reduced speed, in order that the gravity descent of glass through the opening 52 will be slower than the gravity descent of the stream 5, and will therefore receive a substantial impulse from the stream 5. Or, the gear 55 may be operated for a time to reverse the rotation of the cup, so as to check the circular movement of the glass in the cup.

The glass issuing from the outlet 54 hangs beneath the cup, as in the apparatus of Figs. 1 to 8, and forms a pendant gather N, Fig. 10. The gear 55 is then operated to rotate the centrifugal cup at high speed, which lifts the glass immediately below the outlet 52 and forms a decided attenuation of the glass, whereupon the shears 34 sever the glass and the gather falls into the mold or upon a delivery chute.

As the glass drains from the centrifugal cup, a portion O of the glass adheres to the refractory walls of the cup, and the succeeding gather which is deposited in the cup builds up on this adhering film O, so that after the operation starts the glass never comes into contact with any substance except other glass until it is severed by the shears.

The apparatus of Figs. 9 and 10 may be modified by causing the glass to fall into the rotary cup in two or more vertical streams, one of which may be brought to the center of the cup at the time of discharge.

It will be noted that the centrifugal action of my accumulating cup is entirely different from the action of glass in wrapping itself about a punty head, as the punty is usually rotated with its axis horizontal, or approximately horizontal, and the rotation of the punty is very slow, the glass being accumulated on the punty by the forces of cohesion and adhesion. A centrifugal force sufficient for use in the present invention would cause the punty to be inoperative because the glass would fly off the punty instead of being accumulated thereon. The present device acts upon the exterior of the glass and not, as in the case of the punty, upon the interior of the glass, and it rotates upon a vertical axis and not upon a substantially horizontal axis, as in the punty operation.

The present invention is of particular advantage in the formation of gathers of large weight, for example in the manufacture of battery jars, carboys and other large glassware. Prior glass-feeding methods which deliver the glass in suspended gathers or gobs have been limited as to the weight of the gather that can be delivered, because of the tendency of the pendant gather to break into a stream by its own weight when a certain weight is reached. By my present invention the glass may be accumulated in the centrifugal cup to a weight of several pounds, and the descent of the glass may be regulated, by graduating the rotation of the cup, so as to counteract the tendency of the glass to break into a stream.

Numerous variations in the structural details and method steps above described may be made without departing from my invention, the scope of which is indicated in the appended claims.

I claim as my invention:

1. The method of producing mold charges of molten glass that comprises applying a variable centrifugal force to a descending body of glass to vary the rate of descent of different portions of said body of glass.

2. The method of producing mold charges of molten glass that comprises establishing a descending stream of glass and periodically checking the descent of said stream by setting up centrifugal force therein.

3. The method of producing mold charges of molten glass that comprises establishing a descending stream of glass checking the descent of said stream by means of centrifugal force applied to said stream externally thereof, thereby accumulating a mass of glass at the place where said force is applied and removing said force to permit the accumulated mass to flow by gravity.

4. The method of producing mold charges of molten glass that comprises causing a stream of glass to issue from a downwardly opening outlet causing a portion of said stream to rotate on a vertical axis, thereby widening said stream by centrifugal force and causing the glass to accumulate and periodically reducing said force to permit the accumulated glass to flow.

5. The method of producing mold charges of molten glass that comprises establishing a gravity flow of molten glass, checking the said gravity flow by centrifugal force applied to the glass, permitting a portion of said glass to descend from the gravity-checking point by retarded gravity flow, and then permitting a further portion of said glass to flow by gravity at an increased rate, the two said portions combining to form a freely-hanging mold charge.

6. The method of producing mold charges of molten glass that comprises establishing a gravity flow of molten glass, checking the said gravity flow by applying centrifugal force to the glass, permitting a portion of said glass to descend from the gravity-checking point by gravity retarded by centrifugal force, and then reducing the centrifugal force and thereby permitting a further portion of said glass to flow by gravity at an increased rate, the two said portions combining to form a freely-hanging mold charge.

7. The method of producing mold charges of molten glass that comprises establishing a descending stream of glass and periodically causing a portion of said stream to rotate on a vertical axis, thereby periodically spreading the glass horizontally by centrifugal force and causing the glass to accumulate in a series of masses, each equal to a mold charge.

8. The method of producing mold charges of molten glass that comprises establishing a descending stream of glass, periodically causing a portion of said stream to rotate on a vertical axis, thereby periodically spreading said glass horizontally by centrifugal force and permitting it to accumulate, and reducing the speed of rotation of each accumulated mass, thereby permitting said mass to descend by gravity.

9. The method of producing mold charges of molten glass that comprises establishing a descending stream of glass, receiving said stream in a rotatable cup having a discharge opening in its bottom, rotating said cup to expand said stream by centrifugal force and to accumulate a mass of glass in said cup, and then reducing the speed of rotation of said cup, thereby permitting at least a portion of said mass to flow by gravity through said bottom opening.

10. The method of producing mold charges of molten glass that comprises receiving a descending stream of molten glass in a receptacle rotating on a vertical axis and having an axial opening in its bottom, and periodically increasing and reducing the speed of rotation of said receptacle, thereby alternately accumulating glass in the said receptacle and permitting the accumulated glass to flow through said opening.

11. The method of producing mold charges of molten glass that comprises receiving a descending stream of glass in a rotatable cup having a discharge opening in its bottom, rotating said cup to expand said stream by centrifugal force and to accumulate a mass of glass in said cup, reducing the speed of rotation of said cup, thereby permitting at least a portion of said glass to flow by gravity through said bottom opening, then increasing the speed of rotation of said cup, thereby forming an attenuation in the glass beneath said bottom opening, and severing the glass at the point of attenuation.

12. The method of producing mold charges of molten glass that comprises receiving a descending stream of glass in a rotatable cup having a discharge opening in its bottom, rotating said cup to expand said stream by centrifugal force and to accumulate a mass of glass in said cup, then reducing the speed of rotation of said cup, thereby permitting the glass to flow through said bottom opening by gravity retarded by centrifugal force, then stopping the rotation of said cup to permit glass to flow through said bottom opening by unchecked gravity, thereafter rotating said cup to cause an attenuation in the glass beneath the said opening, and severing the glass at the point of attenuation.

13. The method of producing mold charges of molten glass that comprises receiving a descending stream of molten glass in a rotating cup having an axial discharge opening in its bottom, said stream being received in the said cup eccentrically with respect to the axis of rotation of said cup, accumulating a mass of glass in said cup, and then moving the said cup to bring the said bottom opening into line with the said descending stream of glass.

14. The method of producing mold charges of molten glass that comprises receiving a descending stream of molten glass in a rotating cup having an axial discharge opening in its bottom, said stream being received in the said cup eccentrically with respect to the axis of rotation of said cup, accumulating a mass of glass in said cup, then moving the said cup to bring the said bottom opening into line with the said descending stream of glass, reducing the speed of said cup to permit glass to flow through the said opening, then increasing the speed of said cup to produce an attenuation in the glass beneath said opening, and severing the glass at the point of attenuation.

15. The method of producing mold charges of molten glass that comprises receiving a descending stream of molten glass in a rotating cup having an axial discharge opening in its bottom, said stream being received in the said cup eccentrically with respect to the axis of rotation of said cup, accumulating a mass of glass in said cup, then moving the said cup to bring the said bottom opening into line with the said descending stream of glass, reducing the speed of rotation of said cup to permit glass to flow through said opening by gravity retarded by centrifugal force, then stopping the rotation of said cup to permit glass to flow through said opening by unchecked gravity, then setting the cup in rotation to produce an attenuation in the glass beneath said opening, and severing the glass at the point of attenuation.

16. The method of producing mold charges of molten glass that comprises establishing a descending stream of glass, checking the gravity descent of said stream and accumulating a mass of glass therefrom, permitting a portion of said mass to descend by gravity modified by centrifugal force acting on the glass of said mass, and permitting a further portion of said glass to descend by unchecked gravity, thereby producing a freely-hanging gather of controllable size and shape.

17. Apparatus for producing mold charges of molten glass comprising a rotatable receptacle having a discharge opening in its bottom, means for rotating said receptacle intermittently, and means for introducing a stream of molten glass into said receptacle.

18. Apparatus for producing mold charges of molten glass comprising a rotatable receptacle having a discharge opening in its bottom, means for introducing a stream of molten glass into said receptacle about its axis, and means for intermittently rotating said receptacle.

19. Apparatus for producing mold charges of molten glass comprising a receptacle mounted for rotation about its vertical axis at a varying speed and having a discharge opening in its bottom.

20. Apparatus for producing mold charges of molten glass comprising a receptacle mounted for intermittent rotation on a vertical axis, and having a discharge opening in its bottom and in its axis of rotation, and means for introducing a stream of molten glass into said receptacle.

21. Apparatus for producing mold charges of molten glass comprising a rotatable receptacle having an axial discharge opening in its bottom, and means for cooling said receptacle.

22. Apparatus for producing mold charges of molten glass comprising a rotatable receptacle having an axial opening in its bottom, and having flutes formed on its glass-receiving surface.

23. Apparatus for producing mold charges of molten glass comprising a rotatable receptacle having an axial opening in its bottom, and having flutes formed on its glass-receiving surface, and means for cooling said receptacle.

24. Apparatus for producing mold charges of molten glass comprising an intermittently rotatable receptacle having an axial discharge opening in its bottom, means for severing mold charges from glass discharged through said opening, and a guard disposed below said severing means and adjacent to the opening below the bottom of said receptacle for preventing lateral deflection of the discharged glass during the severing operation.

25. Apparatus for producing mold charges of molten glass comprising a rotatable receptacle having an axial opening in its bottom, a guard disposed adjacent to the opening below the bottom of said receptacle, and means for cooling said cup and said guard.

26. Apparatus for producing mold charges of molten glass comprising a rotatable receptacle having a continuously open axial opening in its bottom, means for introducing into said receptacle a stream of glass of less diameter than said bottom opening and in axial alignment with said discharge opening, and means for temporarily interrupting the flow of glass through said bottom opening.

27. Apparatus for producing mold charges of molten glass comprising a rotatable receptacle having an axial opening in its bottom, means for introducing into said receptacle a stream of glass of less diameter than said bottom opening, and means for temporarily interrupting the flow of glass through said bottom opening, the said interrupting means comprising a divided ring and means for cooling the said ring.

28. Apparatus for producing mold charges of molten glass comprising a rotatable receptacle having downwardly converging inner walls, and having a conical outer wall forming a bearing surface, a stationary support having a bearing fitting around said bearing surface, and means for maintaining a film of liquid between said bearing surfaces.

29. Apparatus for producing mold charges of molten glass comprising a rotatable receptacle having downwardly converging inner walls, and having a conical outer wall forming a bearing surface, a stationary support having a bearing fitting around said bearing surface, means for circulating cooling fluid through the interior of said stationary support, and means for admitting a portion of said fluid between said bearing surfaces.

30. Apparatus for producing mold charges of molten glass comprising means for flowing the glass in a descending stream and an intercepting member rotatable about its axis and reciprocable transversely to said stream and adapted to alternately accumulate a mass of glass therein and to discharge the accumulated glass for delivery to a mold.

31. Apparatus for producing mold charges of molten glass comprising a rotatable cup having an axial discharge opening in its bottom, means for rotating said cup, and means for moving said cup laterally with respect to its axis of rotation.

32. Apparatus for producing mold charges of molten glass comprising a receptacle rotatable about its vertical axis and having an axial discharge opening in its bottom, means for rotating said receptacle and means for moving said receptacle horizontally.

33. Apparatus for producing mold charges of molten glass comprising a rotatable receptacle having a discharge opening in its bottom, a gear carried by said receptacle, two driving gears each adapted to mesh with said first-named gear to rotate said receptacle on a vertical axis, and means for moving said receptacle horizontally to bring said first-named gear into mesh with the said driving gears alternately.

34. Apparatus for producing mold charges of molten glass comprising a rotatable receptacle having a discharge opening in its bottom, a gear carried by said receptacle, two driving gears each adapted to mesh with said first-named gear to rotate said receptacle on a vertical axis, means for moving said receptacle horizontally to bring said first gear into mesh with the said driving gears alternately, and means for introducing a descending stream of glass into said receptacle, the said stream being in line with the said discharge opening when the first-named gear is in mesh with one of the driving gears, and being displaced with said opening when said first-named gear is in mesh with the other driving gear.

35. Apparatus for producing mold charges of molten glass comprising a rotatable receptacle having an axial discharge opening in its bottom, a circular frame carrying said receptacle, anti-friction bearings for supporting said frame, gearing for rotating said frame on a vertical axis, a support for said bearings, horizontal guideways in which said support is slidably supported, means for sliding said support in said guideways, and means for suspending said guideways beneath the discharge outlet of a glass receptacle.

36. A method of producing mold charges of molten glass that comprises applying an intermittent centrifugal force to a descending body of glass to regulate the rate of descent thereof.

37. The method of controlling the issuance of molten glass through an outlet in a container which consists in periodically opposing the action of gravity on the glass at the outlet by centrifugal force applied to the glass adjacent to the outlet.

38. The method of controlling the issuance of molten glass through an outlet in a container which consists in permitting glass to move by gravity to the outlet in the container and periodically overcoming the action of gravity and arresting the movement of glass through the outlet by centrifugal force applied to the glass in the container.

39. The method which consists in permitting molten glass to flow from an outlet in a container and periodically arresting the flow by centrifugal force applied to the glass in the container.

40. The method which comprises causing molten glass to flow through a restricted passageway from a supply body and through an outlet, imparting movement to a wall of said passageway by which a pull is applied to the glass opposing said flow, and periodically increasing the speed of said movement and thereby periodically reducing or arresting the flow.

41. The method of producing mold charges of molten glass which comprises permitting a stream of glass to descend through an outlet of restricted area and sub-dividing the descending stream of glass into a succession of mold charge masses by intermittently applying centrifugal force to said stream above the outlet.

In testimony whereof, I the said JOHN R. KELLER have hereunto set my hand.

JOHN R. KELLER.

CERTIFICATE OF CORRECTION.

Patent No. 1,805,987.                              Granted May 19, 1931, to

JOHN R. KELLER.

It is hereby certified that error appears in the printed specification of the above numbered patent requiring correction as follows: Page 6, lines 51 and 52, claim 18, strike out the phrase "about its axis" and insert the same to follow the word receptacle in line 53; and that the said Letters Patent should be read with this correction therein that the same may conform to the record of the case in the Patent Office.

Signed and sealed this 14th day of July, A. D. 1931.

(Seal)                                                     M. J. Moore,
                                                      Acting Commissioner of Patents.